United States Patent
Matsui et al.

(10) Patent No.: US 9,088,366 B2
(45) Date of Patent: Jul. 21, 2015

(54) OPTICAL TRANSMISSION SYSTEM, CONTROL SIGNAL TRANSMISSION METHOD, AND OPTICAL MODULE

(71) Applicant: FUJITSU LIMITED, Kawasaki (JP)

(72) Inventors: Jun Matsui, Kawasaki (JP); Takatoshi Yagisawa, Kawasaki (JP); Tsuyoshi Yamamoto, Atsugi (JP); Satoshi Ide, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 65 days.

(21) Appl. No.: 13/954,396

(22) Filed: Jul. 30, 2013

(65) Prior Publication Data

US 2014/0056595 A1 Feb. 27, 2014

(30) Foreign Application Priority Data

Aug. 27, 2012 (JP) ................................. 2012-186838

(51) Int. Cl.
| | |
|---|---|
| *H04B 10/12* | (2006.01) |
| *H04B 10/00* | (2013.01) |
| *H04B 10/27* | (2013.01) |
| *H04B 10/073* | (2013.01) |

(52) U.S. Cl.
CPC .............. *H04B 10/27* (2013.01); *H04B 10/073* (2013.01)

(58) Field of Classification Search
CPC ...... H04B 10/073; H04B 10/27; H04B 10/00; H04B 10/07; H04B 10/0731
USPC ........................................ 398/1–38, 135–214
See application file for complete search history.

(56) References Cited

U.S. PATENT DOCUMENTS

| | | | | |
|---|---|---|---|---|
| 4,481,678 | A * | 11/1984 | Sakamoto et al. | 398/202 |
| 6,738,578 | B1 * | 5/2004 | Mihota | 398/22 |
| 7,433,595 | B2 * | 10/2008 | Sakai et al. | 398/10 |
| 8,032,021 | B2 * | 10/2011 | Cole et al. | 398/25 |
| 8,041,227 | B2 * | 10/2011 | Holcombe et al. | 398/138 |
| 2002/0105693 | A1 * | 8/2002 | Kobayashi et al. | 359/124 |
| 2003/0081295 | A1 * | 5/2003 | Kamura | 359/174 |
| 2003/0095303 | A1 * | 5/2003 | Cunningham et al. | 359/110 |
| 2004/0096224 | A1 * | 5/2004 | Naruki et al. | 398/156 |
| 2006/0008276 | A1 * | 1/2006 | Sakai et al. | 398/141 |
| 2006/0056855 | A1 * | 3/2006 | Nakagawa et al. | 398/183 |
| 2008/0205900 | A1 * | 8/2008 | Cole et al. | 398/153 |
| 2010/0021176 | A1 * | 1/2010 | Holcombe et al. | 398/115 |

(Continued)

FOREIGN PATENT DOCUMENTS

| | | | | |
|---|---|---|---|---|
| JP | 8-4760 | * | 2/1996 | ........... H04B 102/28 |
| JP | 2001-063169 | * | 9/2002 | ............. H04L 29/08 |
| JP | 2002-271440 | | 9/2002 | |

*Primary Examiner* — Ken Vanderpuye
*Assistant Examiner* — Abbas H Alagheband
(74) *Attorney, Agent, or Firm* — Staas & Halsey LLP

(57) ABSTRACT

An optical transmission system including a transmitting unit to transmit an optical main signal, a receiving unit to receive the optical main signal, and a transmission line through which the optical main signal is transmitted, the optical transmission system includes: an optical transmitter unit configured to be activated or inactivated based on a control signal so as to transmit the control signal, the optical transmitter being included in the transmitting; and an optical receiver configured to receive light with the activate state or the inactivate state of the optical transmitter the optical receiver being included in the receiving unit, wherein the receiving unit regenerates the control signal, based on a power of the received light.

12 Claims, 12 Drawing Sheets

(56) References Cited

U.S. PATENT DOCUMENTS

2010/0327764 A1* 12/2010 Knapp .......................... 315/250
2014/0064721 A1* 3/2014 Wang ............................... 398/5

* cited by examiner

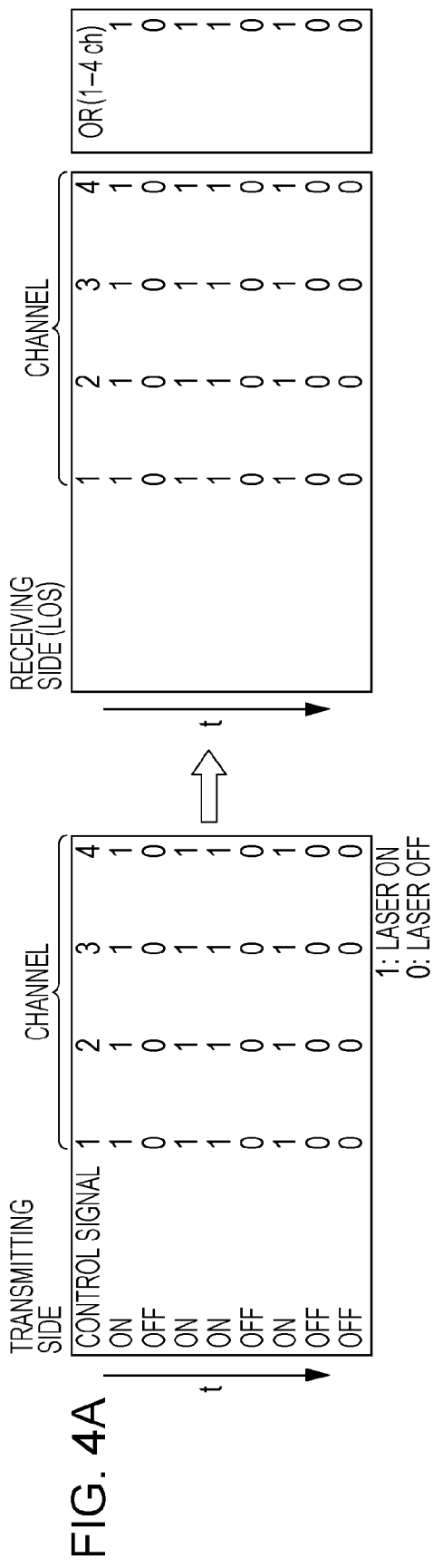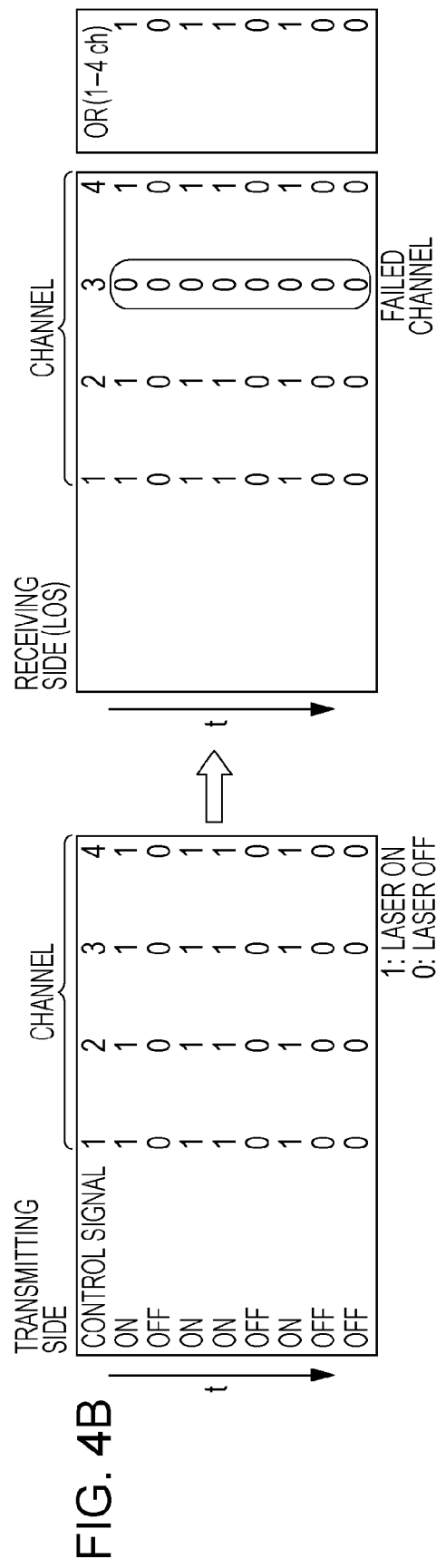
FIG. 4A
FIG. 4B

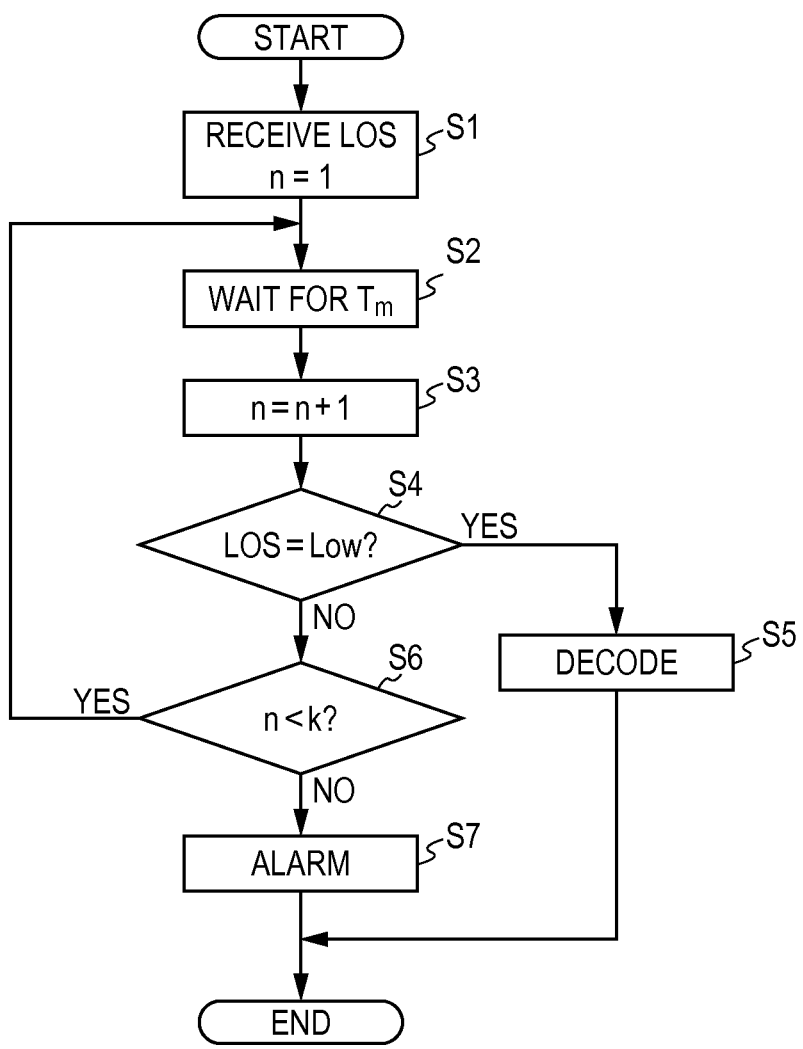

OPTICAL TRANSMISSION SYSTEM, CONTROL SIGNAL TRANSMISSION METHOD, AND OPTICAL MODULE

CROSS-REFERENCE TO RELATED APPLICATION

This application is based upon and claims the benefit of priority from the prior Japanese Patent Application No. 2012-186838 filed on Aug. 27, 2012, the entire contents of which are incorporated herein by reference.

FIELD

The embodiment discussed herein is related to an optical transmission system, a controls signal transmission method, and an optical module.

BACKGROUND

In a transmission system to which an optical signal is applied, it is preferable that information can be transmitted and received in addition to a main signal between a transmitter and a receiver in a simple configuration. Japanese Laid-open Patent Publication No. 2002-271440 discloses a technique in which a transmitter transmits a low frequency ON/OFF signal, in addition to a main signal, to a receiver. Japanese Examined Utility Model Application Publication No. 8-4760 discloses a technique in which transmission/non-transmission to an optical fiber is performed by specifying drive/non-drive of a modulation unit according to a signal.

SUMMARY

According to an aspect of the invention, an optical transmission system including a transmitting unit to transmit an optical main signal, a receiving unit to receive the optical main signal, and a transmission line through which the optical main signal is transmitted, the optical transmission system includes: an optical transmitter configured to be activated or inactivated based on a control signal so as to transmit the control signal, the optical transmitter being included in the transmitting unit; and an optical receiver configured to receive light with the activate state or the inactivate state of the optical transmitter, the optical receiver being included in the receiving unit, wherein the receiving unit regenerates the control signal, based on a power of the received light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are diagrams for explaining an example in which a control signal is transmitted by using channels;

FIG. 6 is an example of a flowchart executed when the LOS signal is determined according to the examples of FIGS. 5A to 5C;

DESCRIPTION OF EMBODIMENTS

Embodiments are to provide an optical transmission system, a control signal transmission method, and an optical module which transmit and receive information different from the main signal between a transmitter and a receiver in a simple configuration. Hereinafter, embodiments will be described with reference to the drawings.

Figure 1:
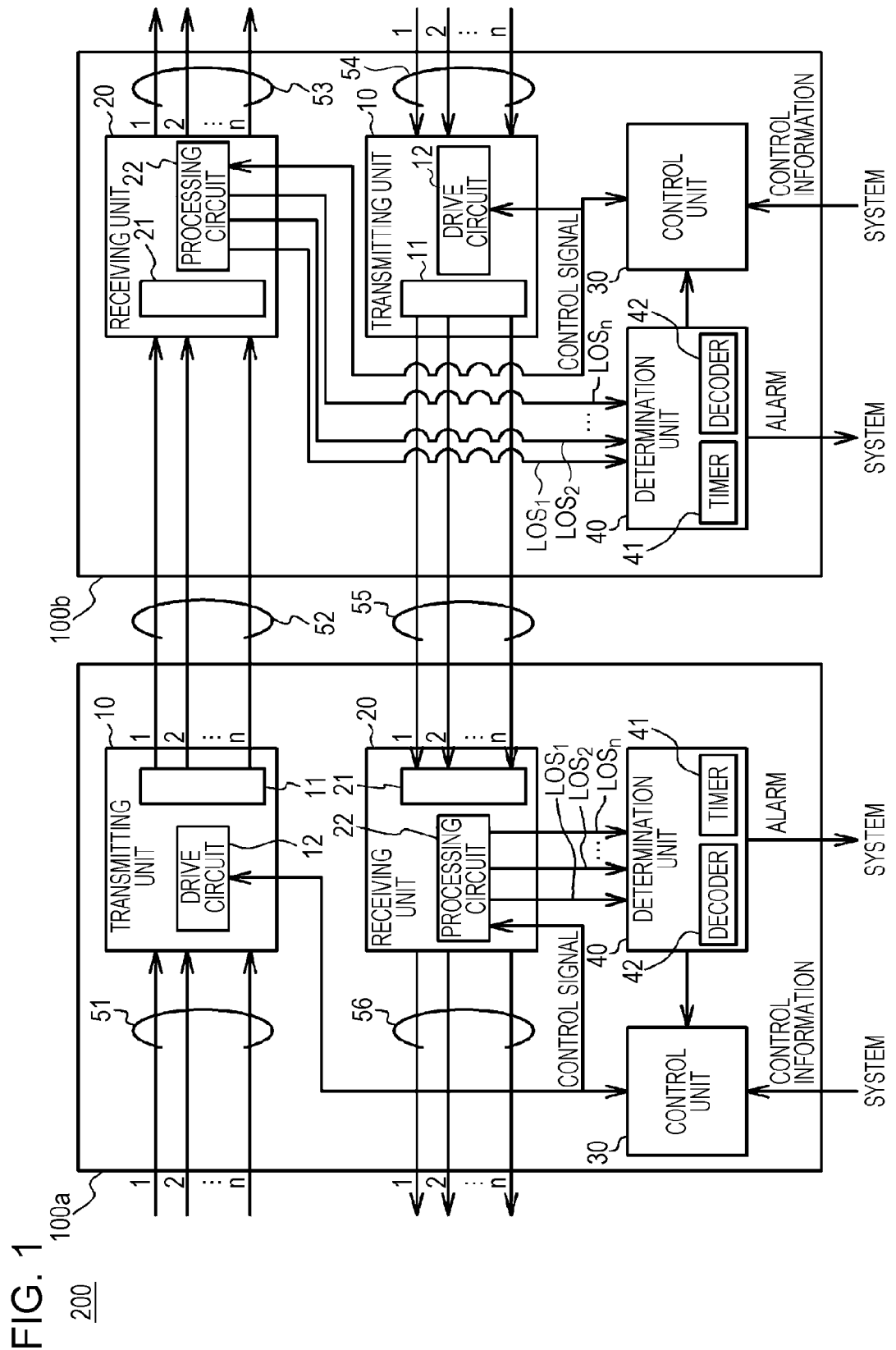
FIG. 1 is a block diagram for explaining an entire configuration of an optical transmission system.

FIG. 1 is a block diagram for explaining an entire configuration of an optical transmission system 200. As illustrated in FIG. 1, the optical transmission system 200 has a configuration in which an optical module 100a and an optical module 100b are connected by a plurality of transmission lines such as optical fibers. Since the optical module 100a and the optical module 100b have the same configuration, the optical module 100a will be described.

The optical module 100a includes a transmitting unit 10, a receiving unit 20, a control unit 30, a determination unit 40, and the like. The transmitting unit 10 includes an optical transmitter 11 in which light emitting elements are arranged, the number of which corresponds to the number of transmission lines (the number of channels) from the optical module 100a to the optical module 100b. The transmitting unit 10 also includes a drive circuit 12 to drive the optical transmitter 11. The optical transmitter 11 is, for example, an array laser in which a plurality of semiconductor lasers are arranged in parallel. The receiving unit 20 includes an optical receiver 21 in which light receiving elements are arranged, the number of which corresponds to the number of transmission lines (the number of channels) from the optical module 100b to the optical module 100a. The receiving unit 20 also includes a processing circuit 22 that processes an electrical signal outputted from the optical receiver 21. The optical receiver 21 is, for example, an array photodiode in which a plurality of photodiodes are arranged in parallel. The processing circuit 22 includes, for example, a Trans Impedance Amplifier (TIA), a limiting amplifier, and the like. The determination unit 40 includes a timer 41 and a decoder 42. The control unit 30 and the determination unit 40 can be realized by a central processing unit (CPU) executing a program loaded in a random access memory (RAM) or the like. Or, the control unit 30 and the determination unit 40 may be configured by using a dedicated circuit or the like.

Next, a transmission of a main signal between the optical module 100a and the optical module 100b will be described. In the optical module 100a, digital electrical signals 51 corresponding to each channel are inputted into the drive circuit 12. Wiring through which the digital electrical signals 51 are transmitted may be either serial or parallel. The drive circuit 12 drives the optical transmitter 11 according to the digital electrical signals 51. For example, when the digital electrical signal 51 of a channel n is inputted into the drive circuit 12, the drive circuit 12 drives the light emitting element of the channel n. Each light emitting element of the optical transmitter 11 outputs an optical main signal 52 to a transmission line corresponding to the channel of the light emitting element. Thereby, the optical main signal 52 is transmitted through each transmission line.

In the optical module 100b, each light receiving element of the optical receiver 21 outputs an electric current according to the optical main signal 52 transmitted through each transmission line. The processing circuit 22 converts the electric currents inputted from the optical receiver 21 into digital electrical signals 53 of each channel and outputs the digital electrical signals 53. Wiring through which the digital electrical signals 53 are transmitted may be either serial or parallel. Through the process described above, the optical main signal 52 is transmitted from the optical module 100a to the optical module 100b. Through a similar process, digital electrical signals 54 inputted into the optical module 100b are transmitted from the optical module 100b to the optical module 100a as an optical main signal 55 and outputted from the optical module 100a as digital electrical signals 56.

Figure 2A:
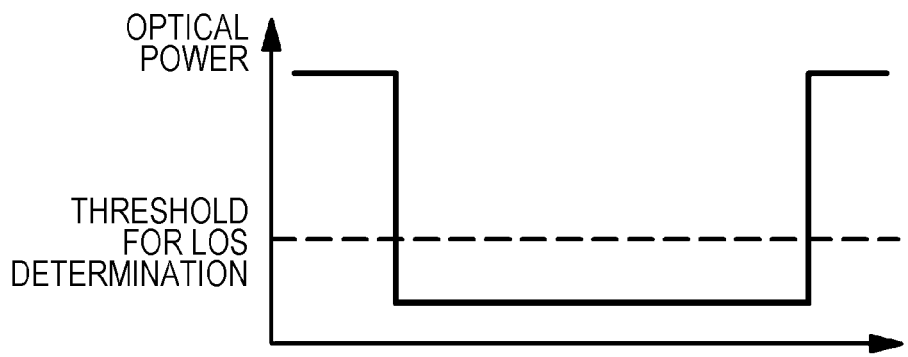
FIGS. 2A and 2B are diagrams for explaining an example of a LOS signal corresponding to a predetermined channel.
Figure 2B:
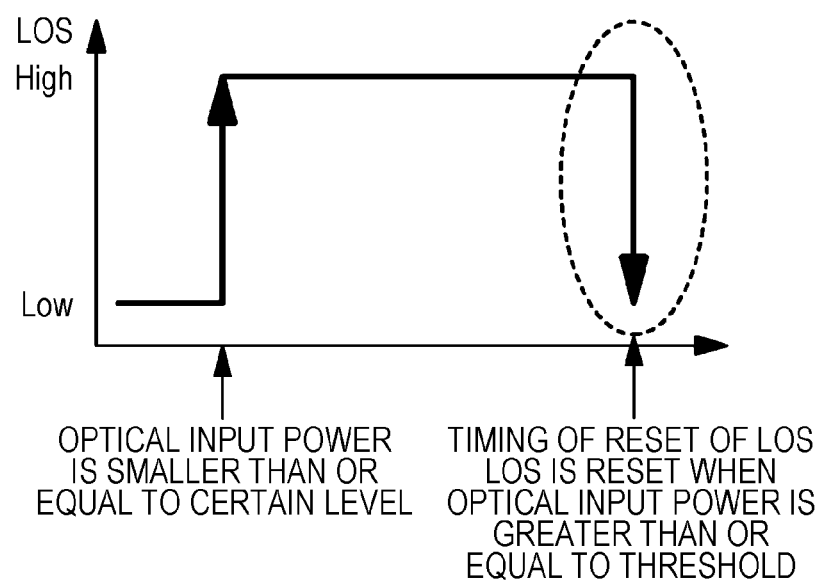

Next, output of Loss Of Signal (LOS) signals by the processing circuit 22 will be described. The processing circuit 22 outputs a LOS signal according to an optical power inputted into each light receiving element of the optical receiver 21 to the determination unit 40 for each channel. FIGS. 2A and 2B are diagrams for explaining an example of the LOS signal corresponding to a predetermined channel.

As illustrated in FIGS. 2A and 2B, the LOS signal becomes high level when the optical input power inputted into the light receiving element of the optical receiver 21 is smaller than a threshold value and becomes low level when the optical input power is greater than the threshold value. The threshold value is a threshold value for determining whether or not there is an input of the main signal for the light receiving element. The high level and the low level may be reversed. In the embodiment, the LOS signal becomes high level when the optical input power is smaller than the threshold value and becomes low level when the optical input power is greater than the threshold value. The processing circuit 22 outputs the LOS signal ($LOS_1$ to $LOS_n$) for each channel. For example, when the LOS signals of all the channels are high level, it can be determined that the main signal is not transmitted. When the LOS signal of a specific channel is high level, it can be determined that a failure occurs in the specific channel.

In the embodiment, control information is transmitted between the optical module 100a and the optical module 100b by using the LOS signals. Hereinafter, the details will be described. When the control unit 30 receives the control information from an external system, the control unit 30 performs a process to realize transmission of the control information through the transmission lines in a period of time in which the main signal is not transmitted and received, for example a period of time before being linked up.

Figure 3:
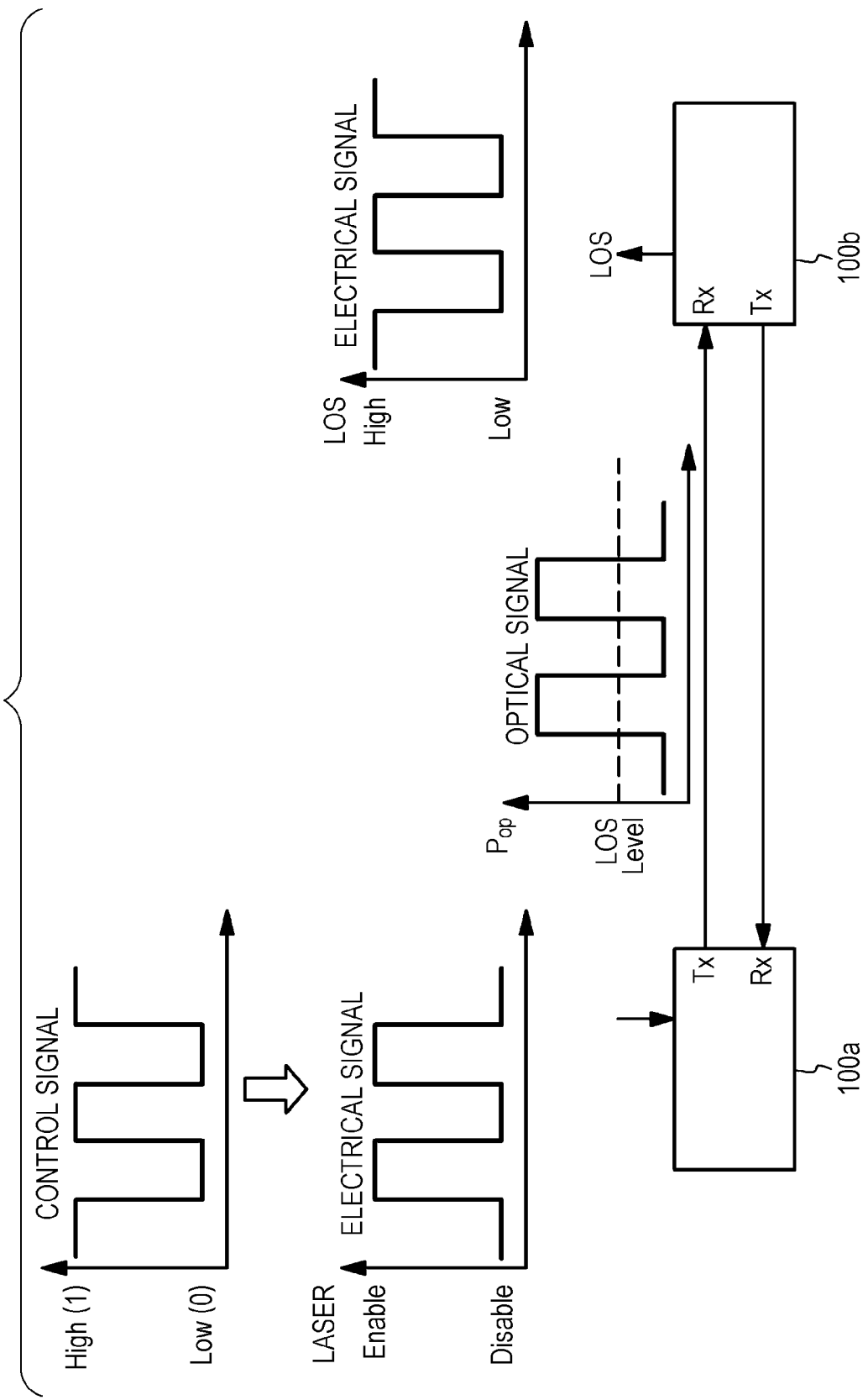
FIG. 3 is a diagram for explaining details of transmission of control information.

FIG. 3 is a diagram for explaining the details of the transmission of the control information from the optical module 100a to the optical module 100b. As illustrated in FIG. 3, in the optical module 100a, the control unit 30 converts the control information into a digital control signal including High (1) and Low (0) and transmits the digital signal to the drive circuit 12. The drive circuit 12 converts the inputted control signal into an electrical signal including Enable and Disable to turn on and off the light emitting elements and outputs the electrical signal to the optical transmitter 11. Thereby, the optical transmitter 11 outputs an optical signal for each channel according to the electrical signal. The optical power outputted from the light emitting element in the optical transmitter 11 may be set to a level so that the LOS signal of the facing optical module 100b is low level when the light emitting element is ON. When the light emitting element is turned off, no optical signal is outputted, so that the LOS of the facing optical module 100b signal becomes high level. The light emitting element does not have to be turned off. The output of the optical signal may be controlled to a level so that the LOS signal becomes high level.

In the optical module 100b, the processing circuit 22 outputs the LOS signal according to the optical input power of the optical signal inputted into the optical receiver 21. In this way, the control information is transmitted between the optical module 100a and the optical module 100b by using the LOS signals. The main signal and the control signal might not have the same bit rate. For example, the control signal may have a bit rate lower than that of the main signal.

The control signal may be transmitted by using a transmission line of a specific channel. However, the control signal may be transmitted by using transmission lines of a plurality of channels. FIGS. 4A and 4B are diagrams for explaining an example in which the control signal is transmitted by using channels 1 to 4. By referring to FIG. 4A, the same control signal may be transmitted by using the transmission lines of each channel and the logical OR may be retrieved as the control signal. By referring to FIG. 4B, even if a failure occurs in a transmission line of a certain channel, the control signal can be retrieved by using the logical OR.

In the embodiment, the control signal is converted into the high level and the low level of the LOS signal, so that it is preferable to be able to determine whether the high level of the LOS signal indicates a part of the control signal or the LOS signal indicates that no control signal is transmitted. Therefore, the determination unit 40 determines the LOS signal. For example, when the control signal is transmitted, the LOS signal changes from the high level to the low level or the low level to the high level. Therefore, if the LOS signal does not change over a period of time in which a predetermined specified period of time Tm (for example, one bit of the control signal) repeats a predetermined number of times (for example, four times), it is possible to determine that no control signal is transmitted. Information related to time can be obtained from the timer 41. The determination unit 40 outputs alarm to an external system if the LOS signal does not change over a period of time in which the specified period of time Tm repeats a predetermined number of times.

Figure 5A:
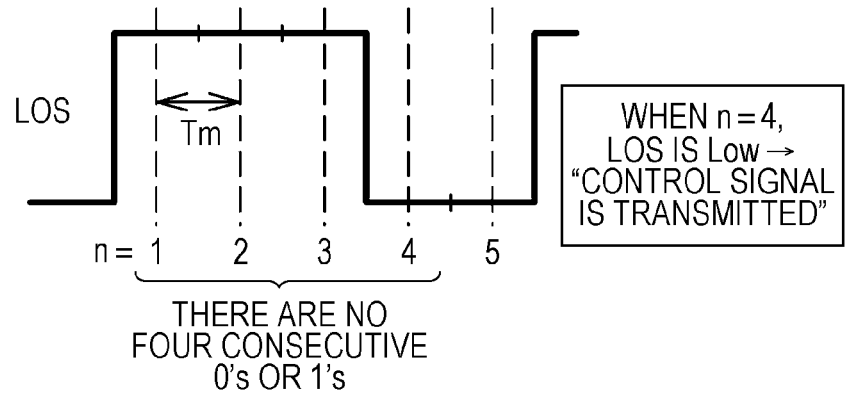
FIGS. 5A to 5C are diagrams illustrating an example of change of the LOS signal.
Figure 5B:
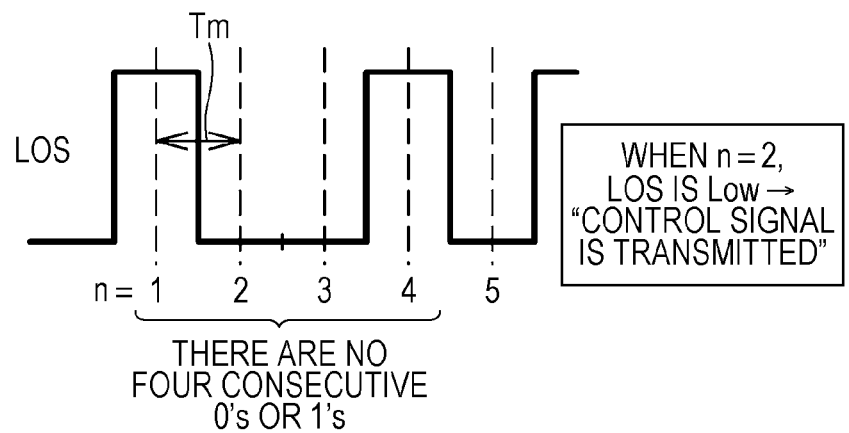
Figure 5C:
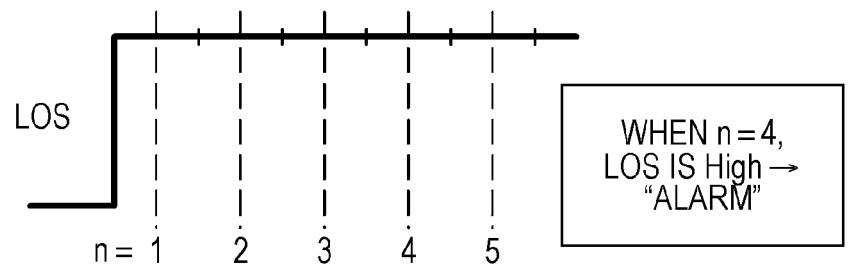

FIGS. 5A to 5C are diagrams illustrating an example of change of the LOS signal. As illustrated in FIGS. 5A and 5B, as an example, the high level and the low level of the LOS signal are included in a period of time in which four bits are transmitted. In this case, the determination unit 40 determines that the control signal is transmitted and instructs the decoder 42 to decode the control signal. Thereby, the decoder 42 retrieves the control information by decoding the control signal and outputs the control information to the control unit 30. On the other hand, in FIG. 5C, the LOS signal does not change in a period of time in which four bits are transmitted. In this case, the determination unit 40 determines that the control signal is not transmitted and outputs alarm to the external system.

FIG. 6 is an example of a flowchart executed when the LOS signal is determined according to the examples of FIGS. 5A to 5C. As illustrated in FIG. 6, when the determination unit 40 receives the LOS signal (High), the determination unit 40 substitutes "1" for "n" (operation 51). Next, the determination unit 40 waits for the period of time Tm (1 bit) (operation S2). Next, the determination unit 40 adds "1" to "n" (operation S3). Next, the determination unit 40 determines whether or not the LOS signal switches to Low (operation S4). If it is determined to be "Yes" in operation S4, the determination unit 40 instructs the decoder 42 to decode the control signal. Thereby, the decoder 42 decodes the LOS signal (operation S5).

If it is determined to be "No" in operation S4, the determination unit 40 determines whether or not "n" is smaller than "k (for example, 4)" (operation S6). If it is determined to be "Yes" in operation S6, the flowchart is re-executed from operation S2. If it is determined to be "No" in operation S6, the determination unit 40 determines that the control signal is not transmitted and outputs alarm to the external system (operation S7). After operation S5 or operation S7 is executed, the flowchart ends.

Or, it is possible to determine the LOS signal by determining start data of the control signal in advance. For example, it is possible to determine that the control signal is transmitted by adding a header "10" to the control signal. As an example, when the data of the control signal is "100110", the data is changed to "10100110", so that it is possible to determine that the control signal is transmitted.

Figure 7A:
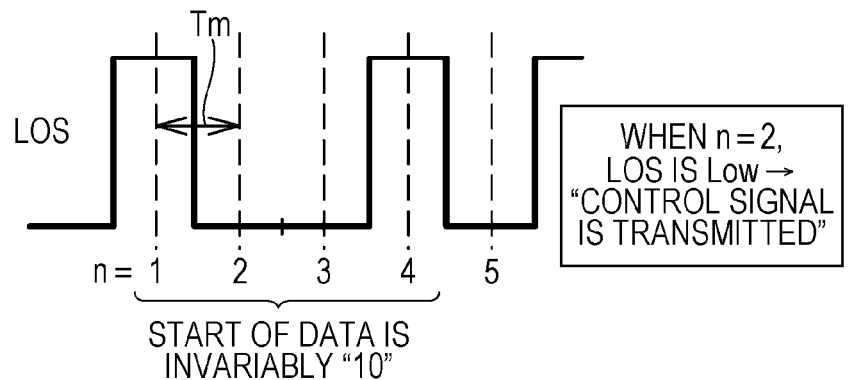
FIGS. 7A and 7B are diagrams illustrating an example of the LOS signal.
Figure 7B:
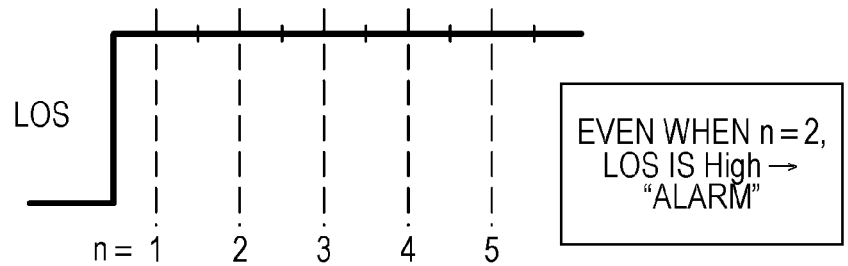

FIGS. 7A and 7B are diagrams illustrating an example of the LOS signal. In FIG. 7A, "1" and "0" appear for each bit, so that it is possible to determine that the control signal is transmitted. In this case, the determination unit 40 instructs the decoder 42 to decode the control signal. Thereby, the decoder 42 retrieves the control information by decoding the control signal by removing the first "10" and outputs the control information to the control unit 30. On the other hand, in FIG. 7B, "1" and "0" do not appear, so that the determination unit 40 determines that the control signal is not transmitted and outputs alarm to the external system.

Figure 8:
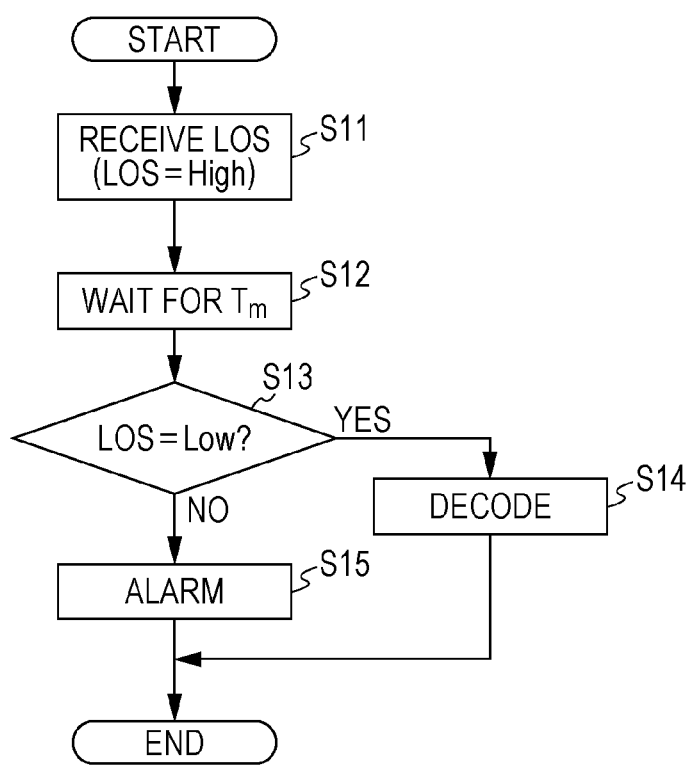
FIG. 8 is an example of a flowchart executed when the LOS signal is determined according to the examples of FIGS. 7A and 7B.

FIG. 8 is an example of a flowchart executed when the LOS signal is determined according to the examples of FIGS. 7A and 7B. As illustrated in FIG. 8, when the determination unit 40 receives the LOS signal (High) (operation S11), the determination unit 40 waits for the period of time Tm (1 bit) (operation S12). Next, the determination unit 40 determines whether or not the LOS signal switches to low level (operation S13). If it is determined to be "Yes" in operation S13, the determination unit 40 instructs the decoder 42 to decode the control signal. Thereby, the decoder 42 decodes the LOS signal (operation S14). If it is determined to be "No" in operation S13, the determination unit 40 determines that the control signal is not transmitted and outputs alarm to the external system (operation S15). After operation S14 or operation S15 is executed, the flowchart ends.

Next, the details of the control information will be described. The control information is information related to operation conditions of the optical module 100a and the optical module 100b. The control information may include information that specifies operation channels. For example, the control information may include information that specifies the signal transmission channels from the optical module 100a to the optical module 100b to be the channels 1 to 4 and specifies the signal transmission channels from the optical module 100b to the optical module 100a to be the channels 1 to 8. When the control unit 30 of the optical module 100a receives the control information from the external system, the control unit 30 converts the control information into the control signal and instructs the drive circuit 12 to transmit the control signal. Thereby, in the optical module 100b, the decoder 42 decodes the control signal into the control information and the control unit 30 receives the control information. After the process described above, the signal transmission channels from the optical module 100a to the optical module 100b are set to the channels 1 to 4 and the signal transmission channels from the optical module 100b to the optical module 100a are set to the channels 1 to 8. Thereafter, the channels 1 to 4 are used to transmit the main signal from the optical module 100a to the optical module 100b and the channels 1 to 8 are used to transmit the main signal from the optical module 100b to the optical module 100a.

The control information may include information that specifies an operation rate. When the control information is transmitted and received between the optical module 100a and the optical module 100b, the bit rate of the main signal transmitted through each transmission line is changed. The control information may include a transition command of a port state. When a transition command to a stop state is transmitted and received between the optical module 100a and the optical module 100b, each unit in the optical module 100a and the optical module 100b goes to a power off state. When a transition command to a dormant state is transmitted and received between the optical module 100a and the optical module 100b, partial units in the optical module 100a and the optical module 100b (for example, the transmitting units) go to the power off state and the other units go to a stand-by state. The transition command to the dormant state may include information that specifies operation channels and increases or decreases the number of channels which go to the stand-by state in the receiving unit 20. The control information includes information that indicates setting of the operation conditions of the optical modules, such as the channel specification and the operation rate, will be completed (accepted) or information that indicates the setting is rejected.

Figure 9:
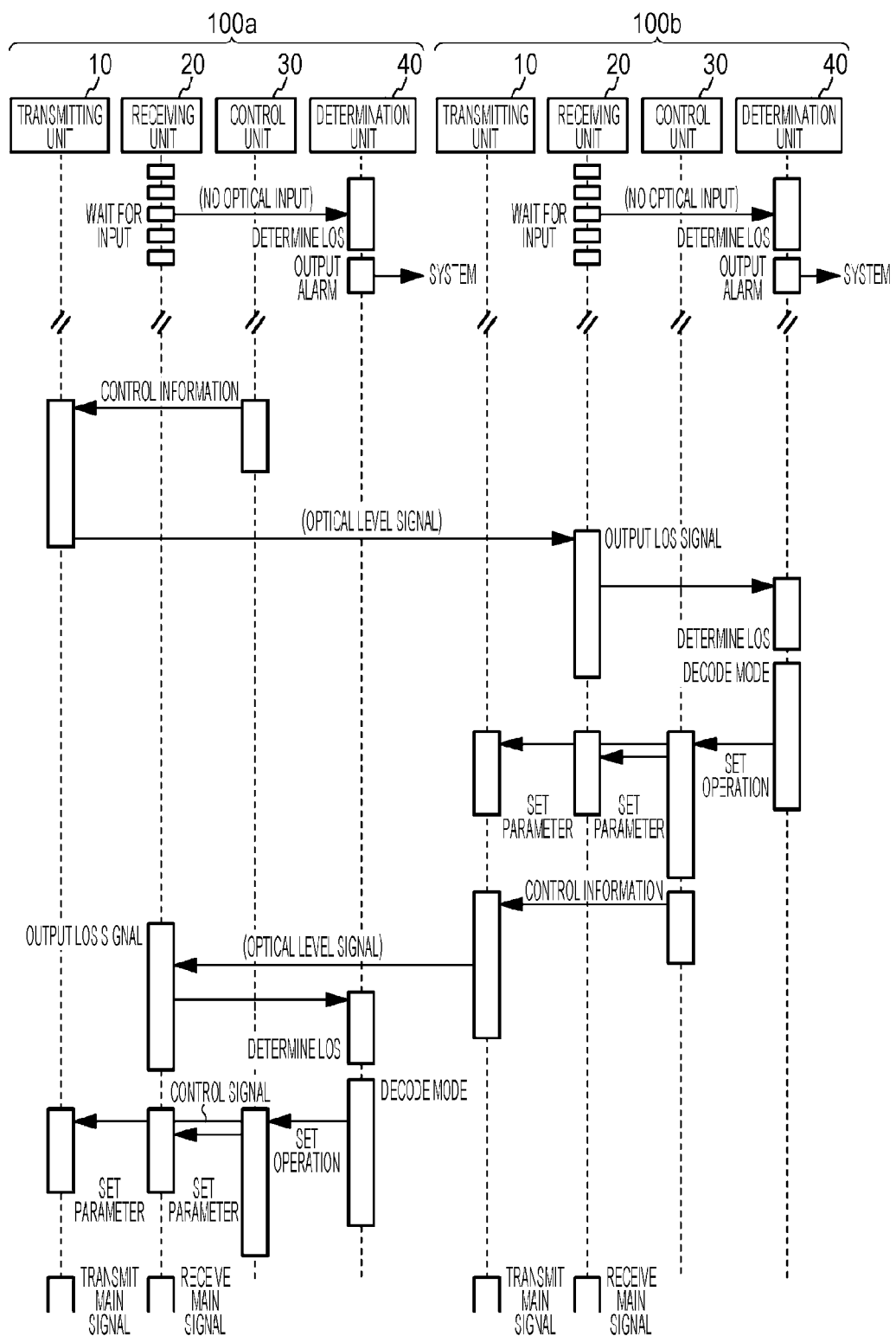
FIG. 9 is a diagram illustrating a time sequence for explaining details of transmission and reception of the control information.

FIG. 9 is a diagram illustrating a time sequence for explaining the details of the transmission and reception of the control information between the optical module 100a and the optical module 100b. Before the transmission and reception of the control information, the receiving unit 20 is in a state of waiting for input of an optical signal in both the optical module 100a and the optical module 100b. Therefore, the LOS signal outputted from the processing circuit 22 maintains the high level. Thereby, the determination unit 40 outputs alarm to the external system.

When the control information is inputted into the control unit 30 of the optical module 100a, the control unit 30 converts the control information into a digital control signal and outputs the digital control signal to the transmitting unit 10. The transmitting unit 10 transmits a control signal according to the control signal to the optical module 100b through each transmission line.

In the optical module 100b, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 sets the operations of the transmitting unit 10 and the receiving unit 20 by setting parameters of the transmitting unit 10 and the receiving unit 20 according to the received control information. Also, the control unit 30 converts the control information inputted to the optical module 100b into a digital control signal and outputs the digital control signal to the transmitting unit 10. The transmitting unit 10 transmits a control signal according to the control signal to the optical module 100a through each transmission line.

In the optical module 100a, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 sets the operations of the transmitting unit 10 and the receiving unit 20 by setting parameters of the transmitting unit 10 and the receiving unit 20 according to the received control information. Through the process described above, the operations of the optical module 100a and the optical module 100b are set. Although, in the example of FIG. 9, the control signal is transmitted from the optical module 100b to the optical module 100a, the control unit 30 of the optical module 100a may set parameters of each unit on the basis of control information received from the external system. Although, in the example of FIG. 9, the transfer of the control information between the optical modules 100a and 100b is completed by one transfer, for example, when the operation channels notified from the optical module 100a may not be used by the optical module 100b, the control information may be transferred a plurality of times, such as, the optical module 100b notifies the optical module 100a that the setting is rejected and the optical module 100a newly specifies the operation channels.

Figure 10:
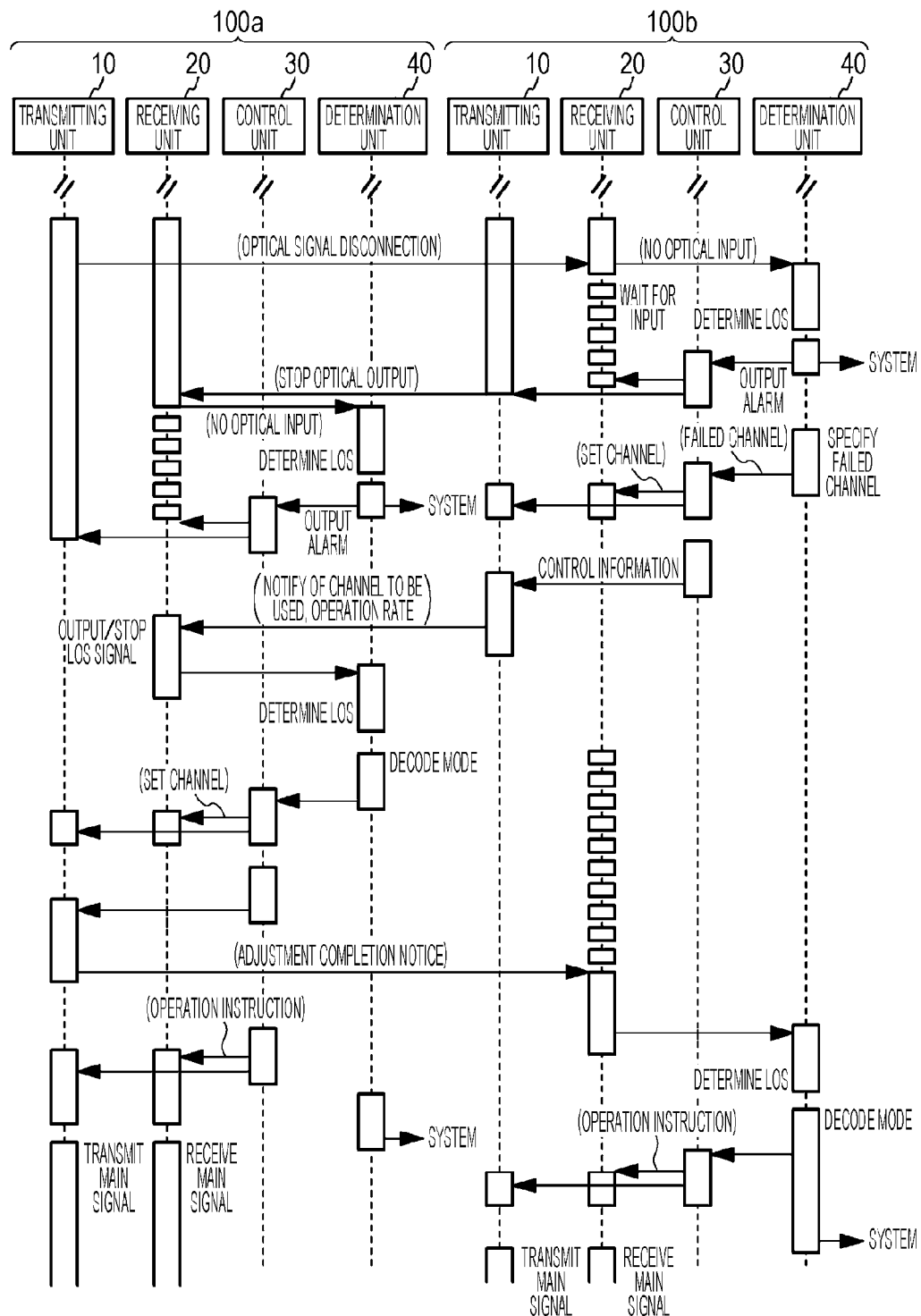
FIG. 10 is a diagram illustrating a time sequence when a certain transmission line fails.

FIG. 10 is a diagram illustrating a time sequence when a certain transmission line from the optical module 100a to the optical module 100b fails. When a transmission line fails, through the transmission line, no light is inputted into the receiving unit 20 of the optical module 100b. Thereby, in the optical module 100b, the determination unit 40 determines the LOS signal and outputs alarm to the external system and the control unit 30. Thereby, the control unit 30 stops the transmission and reception performed by the transmitting unit 10 and the receiving unit 20. In this case, the determination unit 40 specifies the failed channel on the basis of the LOS signal.

In this case, no light is inputted into the receiving unit 20 of the optical module 100a. Thereby, in the optical module 100a, the determination unit 40 determines the LOS signal and outputs alarm to the external system and the control unit 30. Thereby, the control unit 30 stops the transmission and reception performed by the transmitting unit 10 and the receiving unit 20. Through the process described above, the transmission and reception of the main signal are stopped between the optical module 100a and the optical module 100b.

Subsequently, in the optical module 100b, the determination unit 40 notifies the control unit 30 of the failed channel. Thereby, the control unit 30 sets the operation channels of the transmitting unit 10 and the receiving unit 20. Further, the control unit 30 forms the control information from the information of the set operation channels and the operation rate, converts the control information into a digital control signal, and outputs the digital control signal to the transmitting unit 10. The transmitting unit 10 transmits a control signal according to the control signal to the optical module 100a through each transmission line.

In the optical module 100a, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 sets the operation channels of the transmitting unit 10 and the receiving unit 20 according to the received control information. Also, the control unit 30 converts information for notifying that the setting is completed into a digital control signal and outputs the digital control signal to the transmitting unit 10. The transmitting unit 10 transmits a control signal according to the control signal to the optical module 100b through each transmission line. Also, the control unit 30 causes the transmitting unit 10 and the receiving unit 20 to operate.

In the optical module 100b, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 recognizes that the setting is completed and causes the transmitting unit 10 and the receiving unit 20 to operate.

Figure 11:
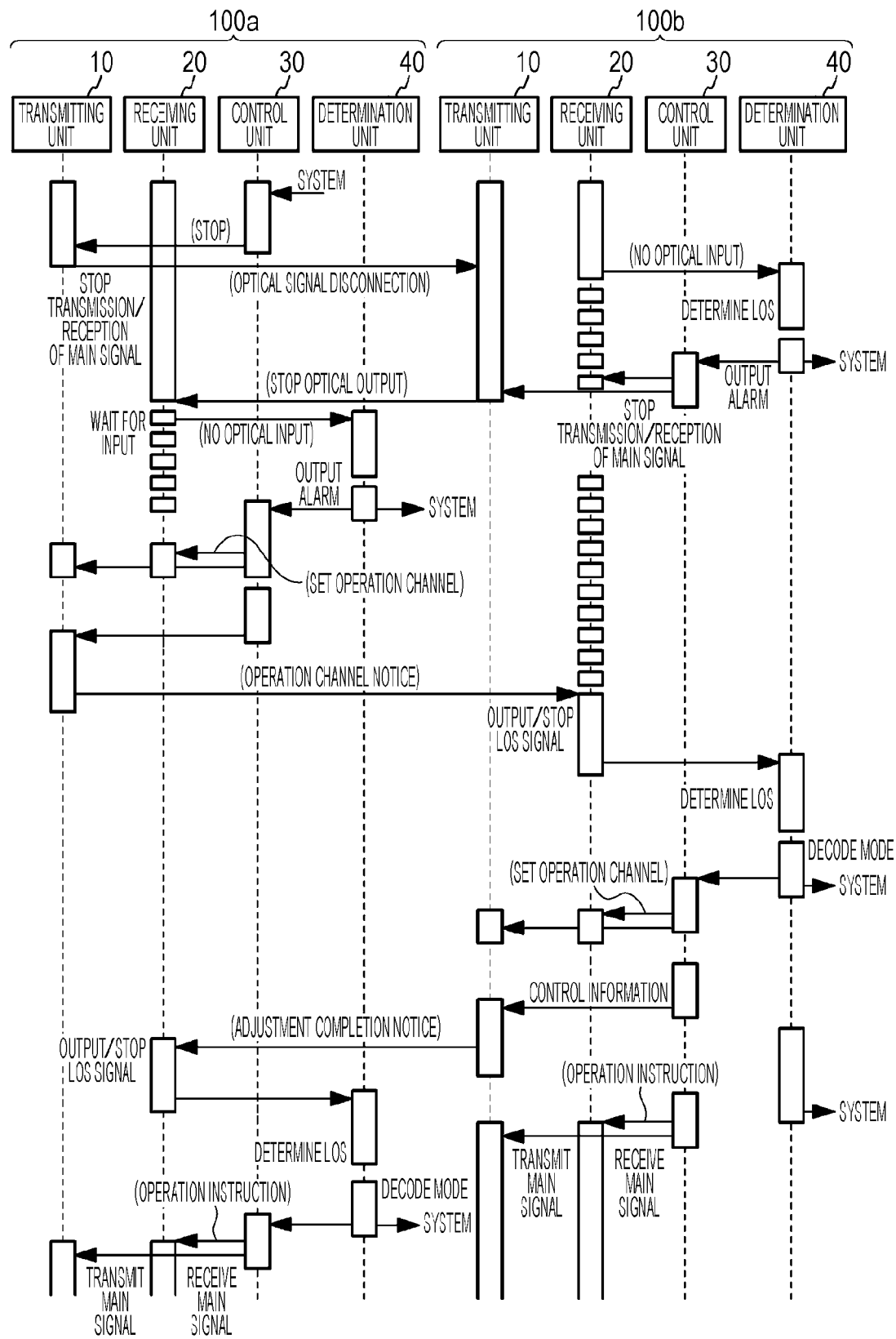
FIG. 11 is a diagram illustrating a time sequence when the number of operation channels is changed by an instruction from an external system.

FIG. 11 is a diagram illustrating a time sequence when the control unit 30 of the optical module 100a changes the number of operation channels by an instruction from the external system. In the optical module 100a, when the control unit 30 receives an instruction to change the number of operation channels from the external system, the control unit 30 causes the transmitting unit 10 to stop the transmission of the main signal.

In this case, in the optical module 100b, no light is inputted into the receiving unit 20. Thereby, the determination unit 40 determines the LOS signal and outputs alarm to the external system and the control unit 30. Thereby, the control unit 30 stops the transmission and reception performed by the transmitting unit 10 and the receiving unit 20.

In this case, no light is inputted into the receiving unit 20 of the optical module 100a. Thereby, in the optical module 100a, the determination unit 40 determines the LOS signal and outputs alarm to the external system and the control unit 30. Thereby, the control unit 30 recognizes that the transmission and reception of the main signal is also stopped in the optical module 100b and sets the operation channels of the transmitting unit 10 and the receiving unit 20. Further, the control unit 30 forms the control information from the information of the set operation channels, converts the control information into a digital control signal, and outputs the digital control signal to the transmitting unit 10. The transmitting unit 10 transmits a control signal according to the control signal to the optical module 100b through each transmission line.

In the optical module 100b, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 sets the operation channels of the transmitting unit 10 and the receiving unit 20 according to the received control information. Also, the control unit 30 converts information for notifying that the setting is completed into a digital control signal and outputs the digital control signal to the transmitting unit 10. The transmitting unit 10 transmits a control signal according to the control signal to the optical module 100a through each transmission line. Also, the control unit 30 causes the transmitting unit 10 and the receiving unit 20 to operate.

In the optical module 100a, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30.

The control unit 30 recognizes that the setting is completed and causes the transmitting unit 10 and the receiving unit 20 to operate.

Figure 12:
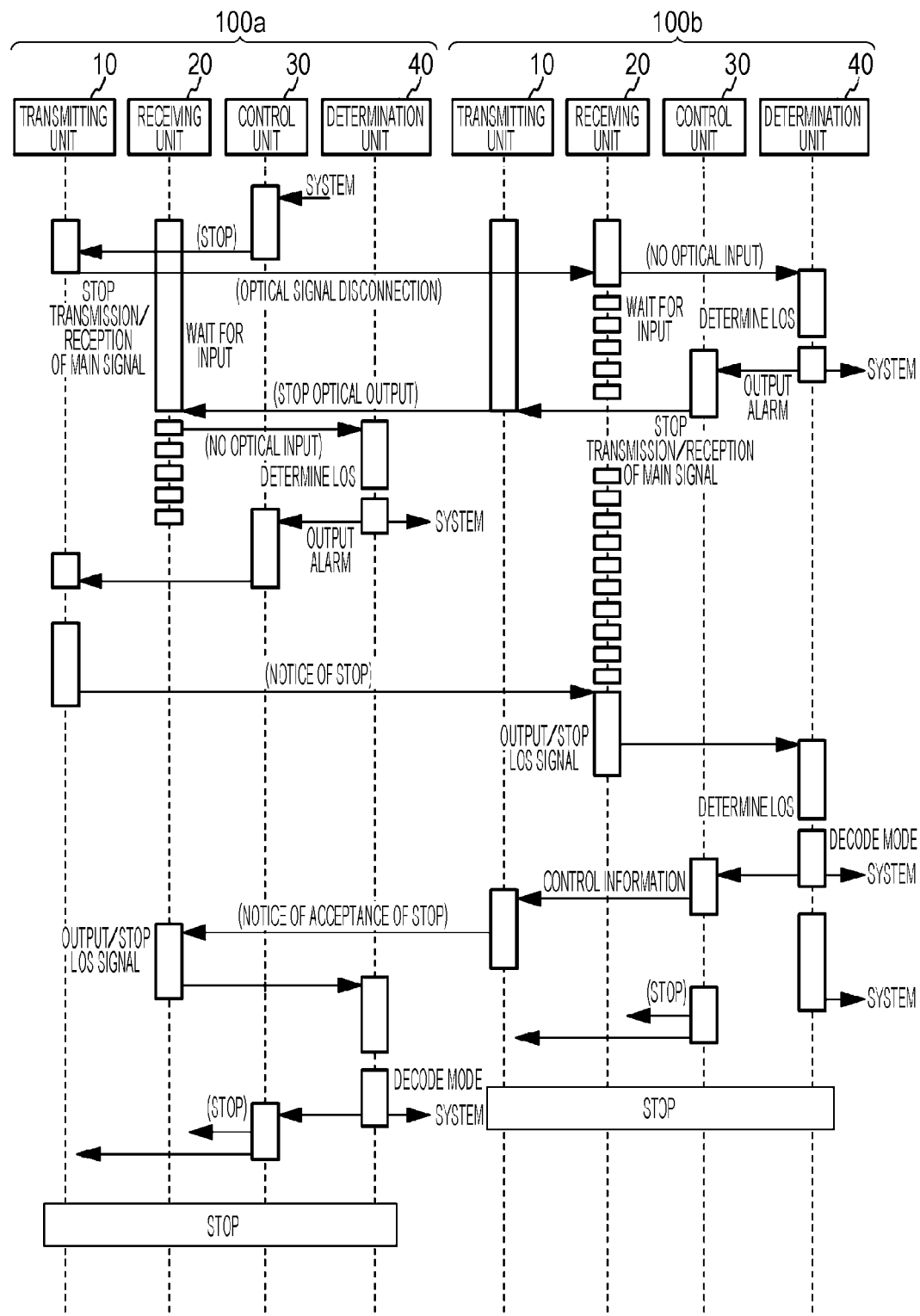
FIG. 12 is a diagram illustrating a time sequence when a port state is changed to a stop state.

FIG. 12 is a diagram illustrating a time sequence when a port state is changed to a stop state. In the optical module 100a, when the control unit 30 receives an instruction to change the port state to the stop state from the external system, the control unit 30 causes the transmitting unit 10 to stop the transmission of the main signal.

In this case, in the optical module 100b, no light is inputted into the receiving unit 20. Thereby, the determination unit 40 determines the LOS signal and outputs alarm to the external system and the control unit 30. Thereby, the control unit 30 stops the transmission and reception performed by the transmitting unit 10 and the receiving unit 20.

In this case, no light is inputted into the receiving unit 20 of the optical module 100a. Thereby, in the optical module 100a, the determination unit 40 determines the LOS signal and outputs alarm to the external system and the control unit 30. Thereby, the control unit 30 recognizes that the transmission and reception of the main signal is also stopped in the optical module 100b, forms the control information indicating that the port state is changed to the stop state, converts the control information into a digital control signal, and outputs the digital control signal to the transmitting unit 10. The transmitting unit 10 transmits a control signal according to the control signal to the optical module 100b through each transmission line.

In the optical module 100b, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 turns off the power of the transmitting unit 10 and the receiving unit 20 according to the received control information. Also, the control unit 30 converts information for notifying that the stop is accepted into a digital control signal and outputs the digital control signal to the transmitting unit 10. The transmitting unit 10 transmits a control signal according to the control signal to the optical module 100a through each transmission line.

In the optical module 100a, the receiving unit 20 outputs a digital LOS signal to the determination unit 40 according to an inputted optical input power. The determination unit 40 determines the LOS signal and the decoder 42 decodes the control signal. The determination unit 40 outputs the control information obtained by the decoding to the control unit 30. The control unit 30 recognizes that the stop is accepted and turns off the power of the transmitting unit 10 and the receiving unit 20. Through the process described above, the optical transmission system 200 goes into the stop state.

According to the embodiment, a plurality of transmission lines are provided, so that it is possible to transmit and receive the control signal even if a failure occurs in a certain transmission line. The control signal includes the high level greater than the threshold value of the optical power for determining whether or not there is an input of the main signal and the low level smaller than the threshold value, so that it is possible to distinguish between the main signal and the control signal. It is detected that the high level and the low level is included in the control signal in a predetermined period of time, so that whether or not the control signal is inputted can be determined. The transmission lines for the main signal are used, so that another line for the control signal is not typically used. The control signal different from the main signal is transmitted and received, so that it is possible to avoid band limitation and data delay of the main signal. In this way, it is possible to transmit and receive information different from the main signal between a transmitter and a receiver in a simple configuration.

If the control signal can be transmitted and received even when a failure occurs in a certain transmission line, the number of channels and the bit rate can be changed. In this case, it is possible to continue transmission and reception of the main signal by performing a reduction operation, such as reducing the number of channels. As a result, it is possible to avoid system halt.

The control signal is decoded from the LOS signal, so that it is possible to use an existing device including a LOS signal detection mechanism. In other words, a new configuration is not typically added. A signal other than the LOS signal may be used. For example, the control signal may be decoded by using monitor currents of each light receiving element.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmission system including a transmitting unit to transmit an optical main signal, a receiving unit to receive the optical main signal, and a transmission line through which the optical main signal is transmitted, the optical transmission system comprising:
    an optical transmitter including a plurality of light emitting elements, each of the light emitting elements being configured to be activated or inactivated to output an optical signal based on a control signal, the optical transmitter being included in the transmitting unit; and
    an optical receiver including a plurality of light receiving elements corresponding to the plurality of light emitting elements, each of the light receiving elements being configured to receive a respective optical signal output from the optical transmitter, the optical receiver being included in the receiving unit,
    wherein the receiving unit regenerates the control signal based on a power of the optical signals received from the optical transmitter, and
    wherein each of the light emitting elements outputs the respective optical signal to the optical receiver during a period of time in which the optical main signal is not transmitted between the transmitting unit and the receiving unit.

2. The optical transmission system according to claim 1, wherein
    the receiving unit regenerates the control signal by comparing the power of the received optical signals with a predetermined value.

3. The optical transmission system according to claim 2, wherein
    the transmitting unit transmits the control signal in parallel by using two or more transmission lines, and
    the receiving unit decodes a logical OR of the control signal transmitted through the two or more transmission lines.

4. The optical transmission system according to claim 2, wherein
the control signal includes information of an operation condition between the transmitting unit and the receiving unit, and
the transmitting unit and the receiving unit operate in the operation condition after the control signal is regenerated.

5. The optical transmission system according to claim 2, wherein
the receiving unit determines a failure of the optical transmission system when the power of the received optical signals is smaller than the predetermined value in a predetermined period of time, and
the receiving unit decodes the regenerated control signal when the power of the received optical signals is greater than the threshold value in the predetermined period of time.

6. The optical transmission system according to claim 2, wherein a bit rate of the control signal is smaller than a bit rate of the optical main signal.

7. A control signal transmission method in an optical transmission system including a transmitting unit to transmit an optical main signal, a receiving unit to receive the optical main signal, and a transmission line through which the optical main signal is transmitted, the control signal transmission method comprising:
activating or inactivating each of a plurality of light emitting elements to output an optical signal based on a control signal, the plurality of light emitting elements being included in an optical transmitter of the transmitting unit, each of the light emitting elements outputting the respective optical signal to an optical receiver of the receiving unit during a period of time in which the optical main signal is not transmitted between the transmitting unit and the receiving unit;
receiving the optical signals output from the optical transmitter; and
regenerating the control signal by comparing a power of the received optical signals with a predetermined value.

8. The control signal transmission method according to claim 7, wherein
the control signal is transmitted in parallel by using two or more lines, and
the control signal is regenerated by decoding a logical OR of the control signal transmitted through the two or more lines.

9. The control signal transmission method according to claim 7, wherein
the control signal includes information of an operation condition between the transmitting unit and the receiving unit, and
the transmitting unit and the receiving unit operate in the operation condition after the control signal is regenerated.

10. The control signal transmission method according to claim 7, wherein a bit rate of the control signal is smaller than a bit rate of the optical main signal.

11. An optical module comprising:
an optical transmitter configured to transmit an optical main signal, the optical transmitter including a plurality of light emitting elements, each of the light emitting elements being configured to be activated or inactivated to output an optical signal based on a control signal; and
an optical receiver including a plurality of light receiving elements corresponding to the plurality of light emitting elements, each of the light receiving elements being configured to receive a respective optical signal output from an optical transmitter in a facing optical module so as to regenerate a control signal transmitted from the facing optical module, based on a power of the received optical signals,
wherein each of the light emitting elements outputs the respective optical signal to an optical receiver of the facing optical module during a period of time in which the optical main signal is not transmitted.

12. The optical module according to claim 11, wherein the control signal is regenerated by comparing the power of the received optical signals with a predetermined value.

* * * * *

UNITED STATES PATENT AND TRADEMARK OFFICE
CERTIFICATE OF CORRECTION

Page 1 of 1

PATENT NO.       : 9,088,366 B2
APPLICATION NO.  : 13/954396
DATED            : July 21, 2015
INVENTOR(S)      : Jun Matsui et al.

It is certified that error appears in the above-identified patent and that said Letters Patent is hereby corrected as shown below:

On the title page, item 57 Abstract, Line 10

Delete "transmitter" and insert --transmitter,--, therefor.

Signed and Sealed this
Thirteenth Day of October, 2015

Michelle K. Lee
*Director of the United States Patent and Trademark Office*